Dec. 10, 1935.  C. C. CREED  2,023,759
LAWN MOWER SHARPENER
Filed Dec. 14, 1934
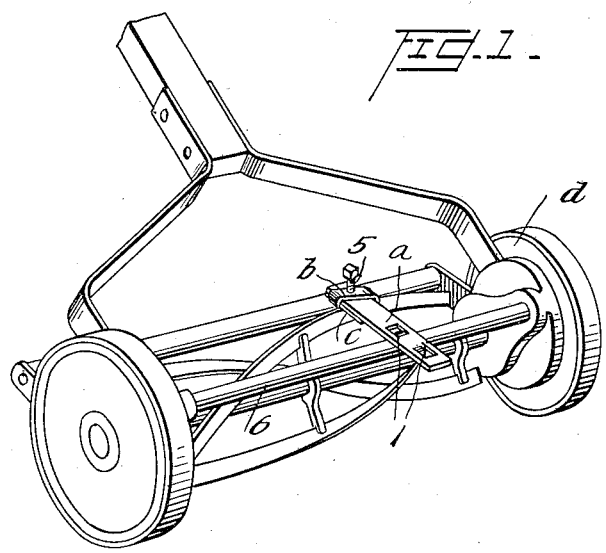
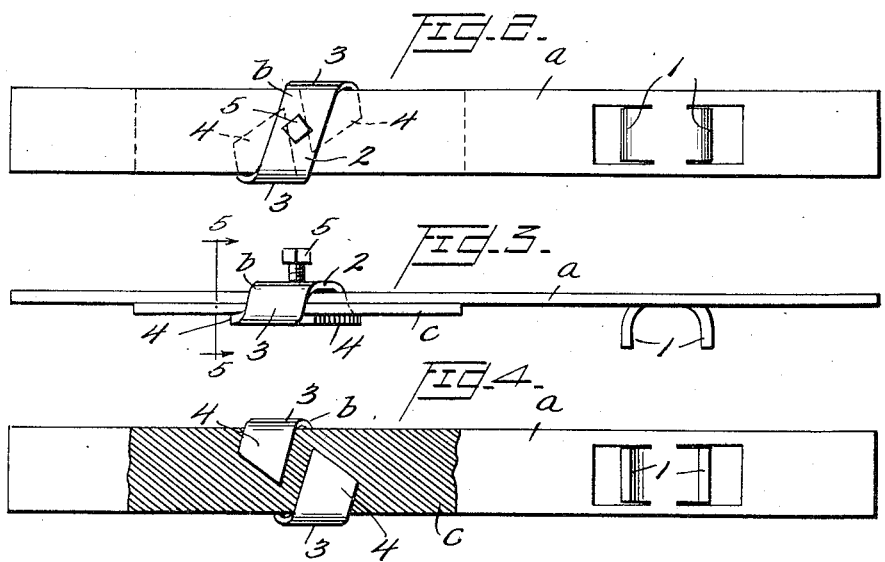
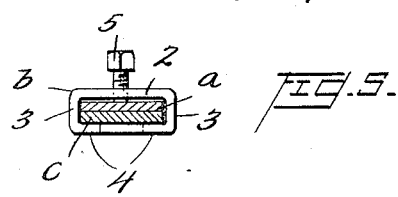

Patented Dec. 10, 1935

2,023,759

UNITED STATES PATENT OFFICE 2,023,759

LAWN MOWER SHARPENER

Calvin C. Creed, Chicago, Ill.

Application December 14, 1934, Serial No. 757,550

2 Claims. (Cl. 76—82.1)

This invention relates to lawn mower sharpeners and the purpose of the invention is to provide a sharpener which is strong and durable and composed of the fewest possible parts and which is inexpensive to manufacture. The sharpener comprises a flat bar having guide lugs near one end adapted to engage a crosspiece on the lawn mower, and a clamp adapted to hold a file against the bar; this clamp consisting of a flat metal strip having its central portion extending across the bar and its end portions bent downwardly at the opposite sides of the bar and thence turned inwardly under the bar, the inwardly turned portions extending diagonally of the bar parallel with and spaced apart from one another and forming therebetween a guide for a lawn mower blade, said inwardly turned portions also serving as a means for holding a file or other suitable abrasive instrument against the bar.

In the accompanying drawing,

Fig. 1 is a perspective view of a lawn mower showing the sharpener positioned thereon;

Fig. 2 is a top plan view of the sharpener;

Fig. 3 is a side view of the same;

Fig. 4 is a bottom plan view of the same, and,

Fig. 5 is a section on the line 5—5 of Fig. 3.

Referring to the drawing, $a$ represents the body of the sharpener, consisting of a flat metal bar of suitable length having near one end two spaced lugs 1, struck up from the body of the bar, and serving as guides adapted to engage a crosspiece 6 on a mower $d$ to guide the sharpener in its movements back and forth along said crosspiece.

A clamp $b$, which serves to hold a file $c$ against the body $a$ and also to guide the spiral blades of the lawn mover is made from a flat metal strip bent into a form resembling a flattened helix, the central portion 2 of the strip extending diagonally across the top of the body $a$, and the end portions being bent downwardly at an angle to the central portion, as shown at 3, and thence turned inwardly under the body, as shown at 4, the inwardly turned portions lying in the same plane and parallel with one another and spaced apart, as best shown in Fig. 4. The inwardly turned parts thus form guides for the knives of the mower and also as means for holding the file against the body. The adjacent edges of the inwardly turned parts 4, it will be noted, extend more than half way across the body so that said edges overlap to the desired extent to guide a cutter blade.

A clamping screw 5 in the central part of the clamp, when tightened against the body of the sharpener, causes the end portions of the clamp to hold the file or other abrasive instrument in place against the body of the sharpener.

In operation, the sharpener is placed upon the mower with the guide lugs 1 straddling the crosspiece and the clamp is set so that one of the mower blades will fit into the space between the inturned ends of the clamp. The sharpener is then moved back and forth on the crosspiece to cause the file to sharpen the blade.

What I claim is:

1. A lawn mower sharpener comprising a flat bar having guide lugs near one end adapted to engage a crosspiece on the mower frame, and an adjustable clamp on the bar adapted to clamp a file against the under side of the bar and to guide a lawn mower blade, said clamp consisting of a metal band having its central portion extending diagonally across the upper side of the bar and having its end portions bent downwardly at the opposite sides of the bar and thence turned inwardly in the same plane under the bar, the inwardly turned portions extending diagonally of the bar parallel with and spaced apart from one another and forming therebetween a guide for a lawn mower blade and adapted to hold a file against the bar, and a clamping screw in said central portion.

2. A lawn mower sharpener comprising a flat bar having guide lugs near one end adapted to engage a cross-piece on the mower frame, and an adjustable clamp on the bar adapted to clamp a file against the underside of the bar and to guide a lawn mower blade, said clamp consisting of a metal band having its central portion extending diagonally across the upper side of the bar and having its end portions bent downwardly at the opposite sides of the bar and thence turned inwardly in the same plane under the bar, the inwardly turned portions extending across the bar parallel with and spaced apart from one another and forming therebetween a guide for a lawn mower blade and adapted to hold a file against the bar, and a clamping screw in said central portion.

CALVIN C. CREED.